United States Patent

Schiller

[11] Patent Number: 6,126,313
[45] Date of Patent: Oct. 3, 2000

[54] TEMPERATURE RESPONSIVE TEMPERATURE/PRESSURE DISPLAY FOR A LIQUEFIED NITROUS OXIDE CONTAINER

[76] Inventor: Robert Schiller, 506 Onderdonk Ave., Ridgewood, N.Y. 11385

[21] Appl. No.: 09/135,195

[22] Filed: Aug. 17, 1998

[51] Int. Cl.⁷ .................. G01K 1/06; G01K 1/14
[52] U.S. Cl. ............ 374/142; 374/162; 73/866.3
[58] Field of Search ................. 374/142, 162, 374/150, 143; 73/866.3

[56] References Cited

U.S. PATENT DOCUMENTS

| | | | |
|---|---|---|---|
| 3,893,340 | 7/1975 | Parker | 374/162 |
| 3,898,354 | 8/1975 | Parker | 374/162 |
| 4,220,680 | 9/1980 | Corsi | 374/162 |
| 4,464,064 | 8/1984 | D'Luzansky | 374/162 |
| 4,916,386 | 4/1990 | Schulz | 374/162 |
| 5,218,834 | 6/1993 | Major et al. | 374/150 |
| 5,738,442 | 4/1998 | Paron et al. | 374/162 |

FOREIGN PATENT DOCUMENTS

| | | | |
|---|---|---|---|
| 3 404 712 | 8/1985 | Germany | 374/162 |
| 1 029 605 A1 | 5/1966 | United Kingdom | 374/162 |

OTHER PUBLICATIONS

"Microencapsulated Liquid Crystal 'Silkscreen' for Component–Failure Detection," IBM Technical Disclosure Bulletin, vol. 32, No. 7, Dec. 1989, pp. 312–314.

Sears and Salinger, Thermodynamics, Kinetic Theory, and Statistical Thermodynamics (Addison–Wesley Publ. Co.) 1975, pp. 24–40.

*Primary Examiner*—Diego Gutierrez
*Assistant Examiner*—Stanley J. Pruchnic, Jr.
*Attorney, Agent, or Firm*—Michael I. Kroll

[57] ABSTRACT

A dual display temperature/pressure gauge (10) for a container (8) of compressed liquefied gas includes a planar strip of material having a display side (12) which is visible when the strip is placed in contact with a container (8) of compressed liquefied gas; a temperature display region (14) on the display side (12) which includes a first set of numerals representing a range of measured temperature readings; a pressure display region (16) on the display side (12) which includes a second set of numerals representing a range of internal vapor pressure readings calculated to correspond to the the temperature numerals; and thermochromic liquid crystal means for displaying the appropriate numerals corresponding to the measured temperature and calculated internal vapor pressure within the container. The gauge is useful for many gases, such as nitrous oxide.

15 Claims, 6 Drawing Sheets

TEMPERATURE RESPONSIVE TEMPERATURE/PRESSURE DISPLAY FOR A LIQUEFIED NITROUS OXIDE CONTAINER

BACKGROUND OF THE INVENTION

FIELD OF THE INVENTION

The instant invention relates generally to thermometer strips and more specifically to thermometer strips for liquefied gas tanks which display both the temperature and the internal vapor pressure of the gas.

Many commercial, industrial and medical processes require the use of gaseous materials, thus requiring transportation and storage. Gases such as nitrous oxide ($N_2O$) can be liquefied under pressure, greatly reducing the volume occupied and resulting in decreased transportation and storage costs. An additional benefit is that compressed liquefied nitrous oxide will exhibit a constant vapor pressure as the gas is removed from the container, until the point where all of the liquid has been vaporized. The internal vapor pressure of the container, however, is affected by temperature. Many uses require that the gas be released at a fairly specific pressure; for these utilities, it is important to maintain the temperature of the container at a constant temperature. One method of tracking the temperature of the storage container is by affixing a thermometer strip to the exterior surface of the container. Unfortunately, this provides no direct information regarding the internal vapor pressure, which is actually the characteristic of interest.

The present invention provides a dual display temperature/pressure gauge which measures the temperature of the container and displays both the temperature and the calculated vapor pressure of the gas.

SUMMARY OF THE INVENTION

The present invention is concerned with thermometer strips and more specifically to dual-display thermometer strips for liquefied compressed gas containers which display both temperature and the calculated internal vapor pressure within the container.

A primary object of the present invention is to provide an externally applied thermometer strip which displays both the temperature and the calculated internal vapor pressure for a liquefied compressed gas container.

Another object of the present invention is to provide an externally applied thermometer strip which displays both the temperature and the calculated internal vapor pressure for a container of liquefied compressed nitrous oxide.

An additional object of the present invention is to provide an externally applied thermometer strip for a container of liquefied compressed gas which shows the user when the internal vapor pressure of the container is too low or too high.

Another object of the present invention is to provide an externally applied thermometer strip for a container of liquefied compressed gas which is easy to use, economical to manufacture and safe and convenient to dispose.

The foregoing and other objects, advantages and characterizing features will become apparent from the following description of certain illustrative embodiments of the invention.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE PREFERRED EMBODIMENTS

Figure 1:
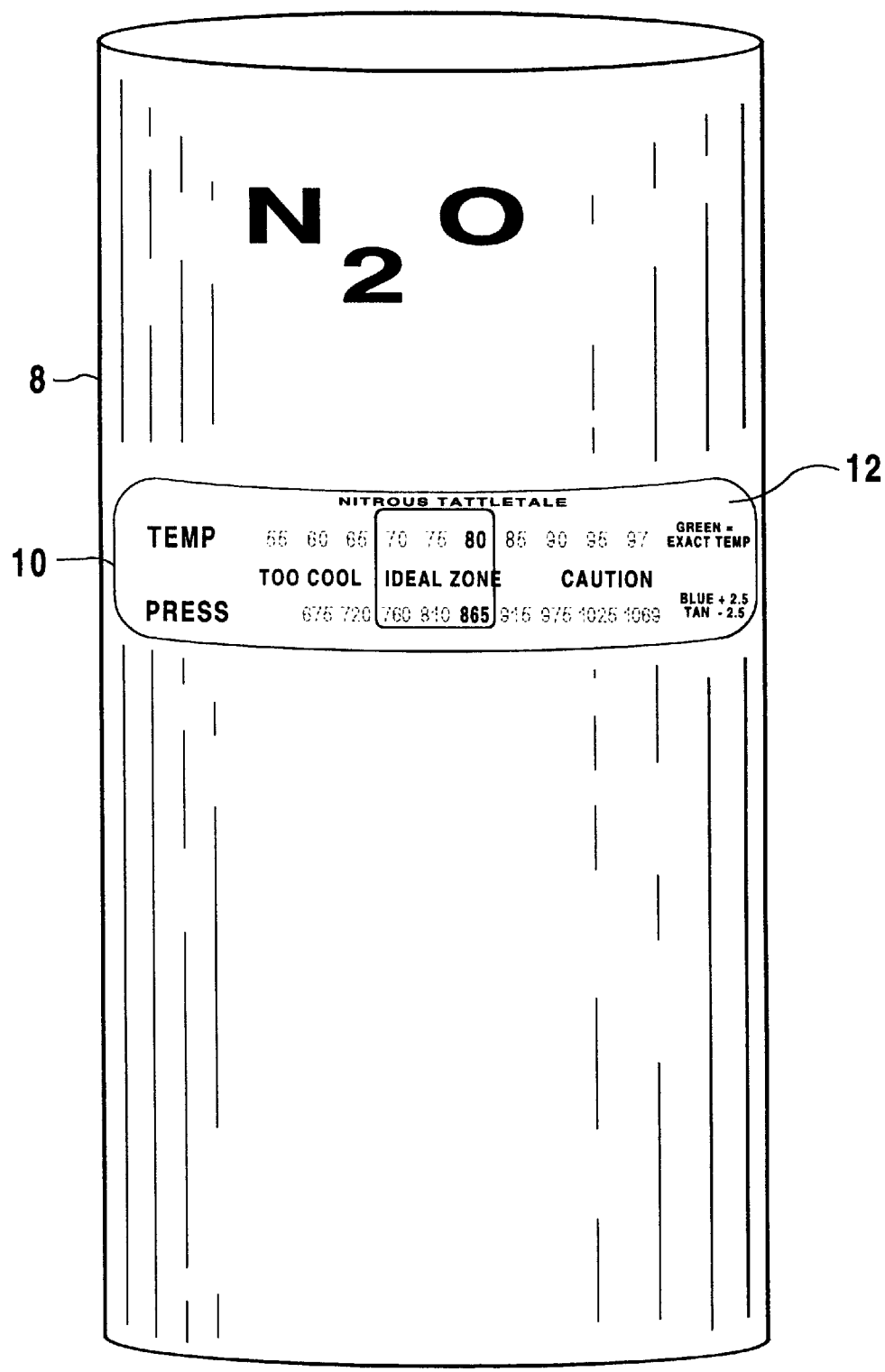
FIG. 1 is a side view of the dual display temperature/pressure gauge of the present invention in place for typical use on a nitrous oxide storage tank.

Turning now descriptively to the drawings, in which similar reference characters denote similar elements throughout the several views, the Figures illustrate a preferred embodiment of the present invention. With regard to the reference numerals used, the following numbering is used throughout the various drawing figures.

8 container for compressed liquefied gas
10 dual display temperature/pressure gauge
12 display side of 10
14 temperature measurement display region of 12
16 pressure calculation display region of 12
18 first informational region of 12, identifying 14
20 second informational region of 12, identifying 16
22 third informational region of 12, identifying when the temperature/pressure is too low
24 fourth informational region of 12, identifying when the temperature/pressure is too high
26 fifth informational region of 12, identifying when the temperature/pressure is in the ideal zone
28 sixth informational region of 12, describing how to interpret 14

30 seventh informational region of 12, showing indications of origin and/or the identification of the gas to be measured 32 non-displayed temperature numerals of 14

34 displayed temperature numerals of 14

36 non-displayed pressure numerals of 14

38 displayed pressure numerals of 14

42 x-axis of graph, denoting the pressure in psi 40 y-axis of graph, denoting the corresponding temperature in ° F.

Figure 6:
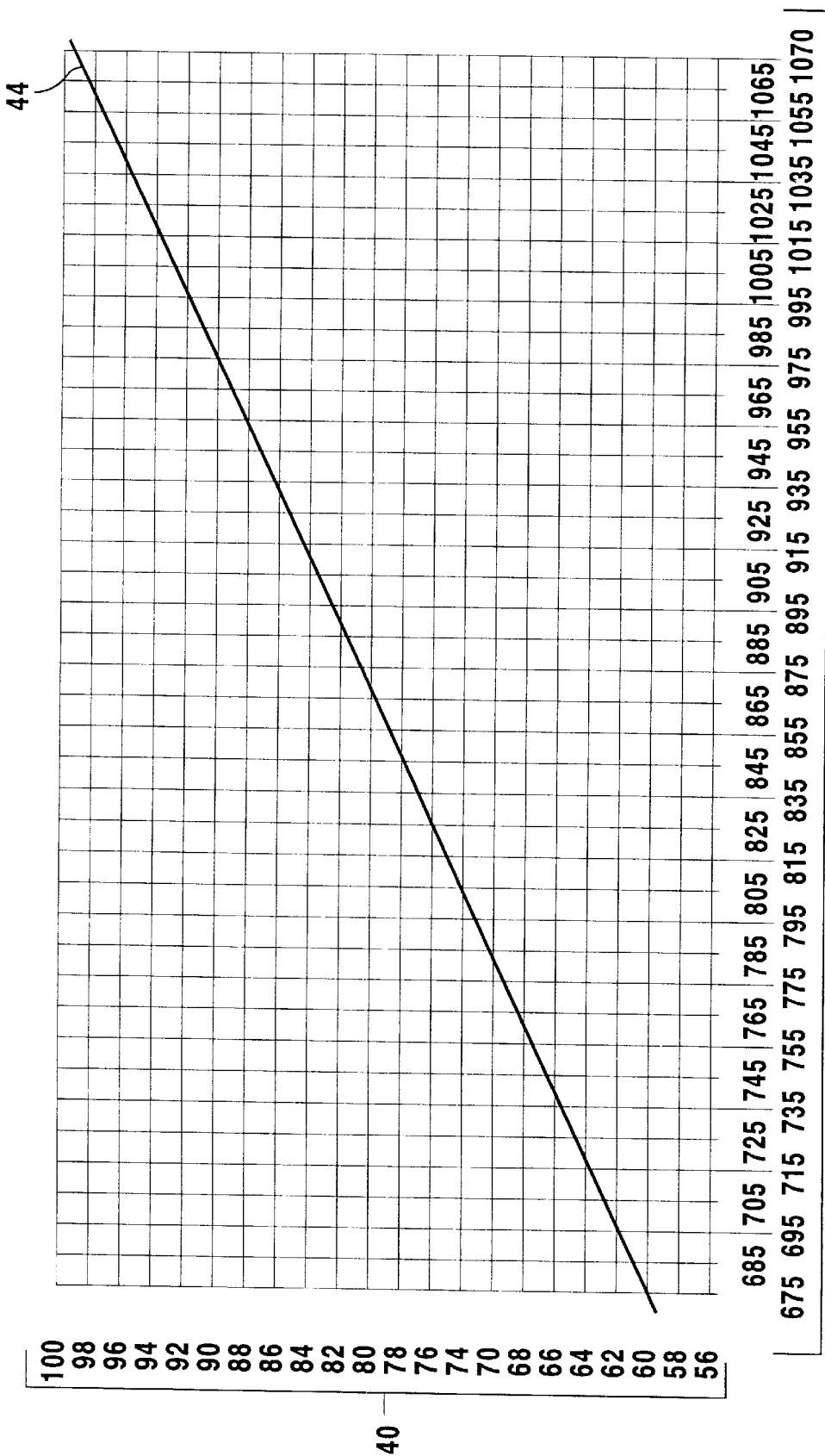
FIG. 6 is a graphical representation of the relationship between temperature and pressure for liquefied compressed nitrous oxide.

44 line graph denoting the relationship between pressure and temperature for compressed liquefied nitrous oxide FIGS. 1 through 5 illustrate an externally applied thermometer strip for a container of liquefied compressed gas. FIG. 6 illustrates the relationship between temperature and pressure for liquefied compressed nitrous oxide.

FIGS. 1 through 5 illustrate the dual display temperature and pressure gauge 10 of the present invention in use with a container 8 of compressed liquefied gas. The present invention is useful for any gas which is capable of being compressed into a liquid. The preferred gas is nitrous oxide ($N_2O$), which can be compressed into a liquid at room temperature, 20° C. (68° F.), by a pressure of 51 atmospheres, or 750 pounds per square inch (psi). As the nitrous oxide vapor is removed from the tank, more nitrous oxide is vaporized, maintaining the liquid/vapor equilibrium, and keeping the pressure at 750 psi, until all the liquid is vaporized, at which point the internal pressure begins to fall. Because the internal vapor pressure remains constant at constant temperature, the present invention can accurately display both temperature and the calculated internal vapor pressure. FIG. 6 shows the approximate relationship between internal vapor pressure and ambient temperature. Nitrous oxide has a critical temperature of 36.4° C. (97.6° F.), at which point it exhibits a critical pressure of 1053 psi. Above this temperature, nitrous oxide cannot be liquefied, that is, the liquid phase does not separate out. It can thus be readily appreciated how important it is to monitor the temperature, and more importantly, the vapor pressure, of the container.

Figure 2:
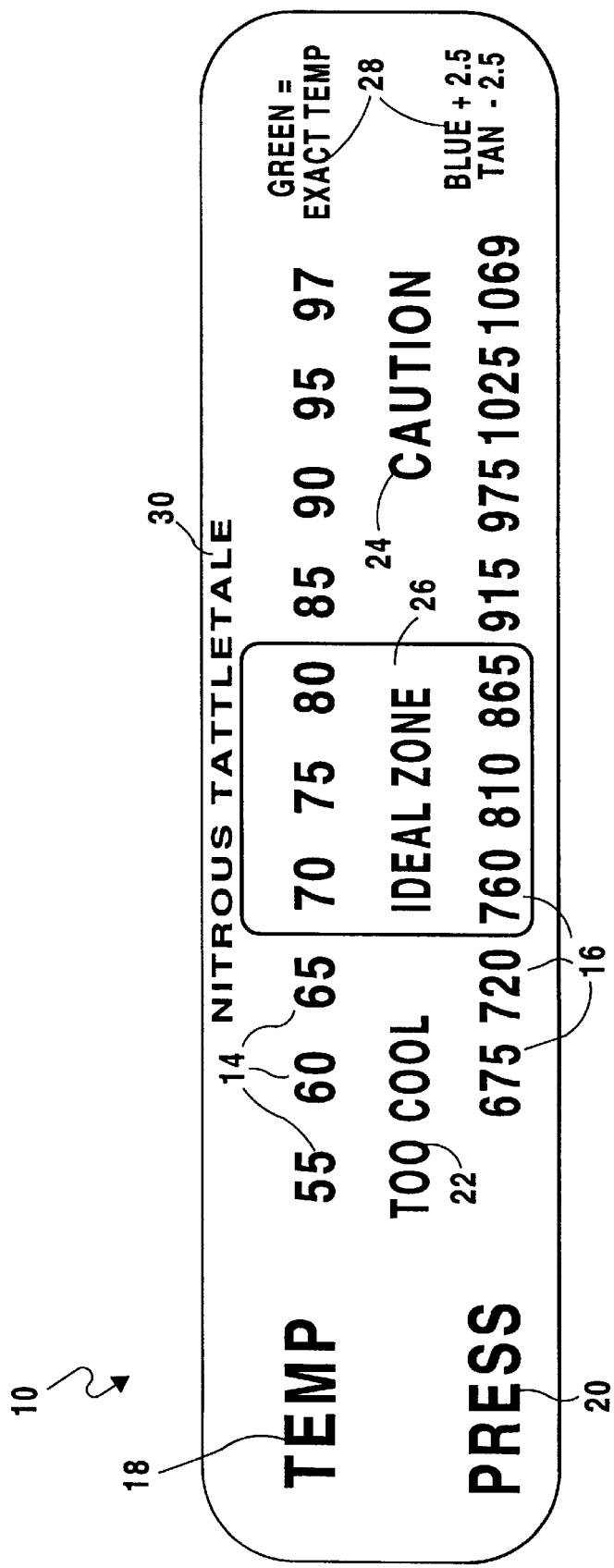
FIG. 2 is a close-up overview of the dual display temperature/pressure gauge of the present invention showing all possible display numerals.
Figure 3:
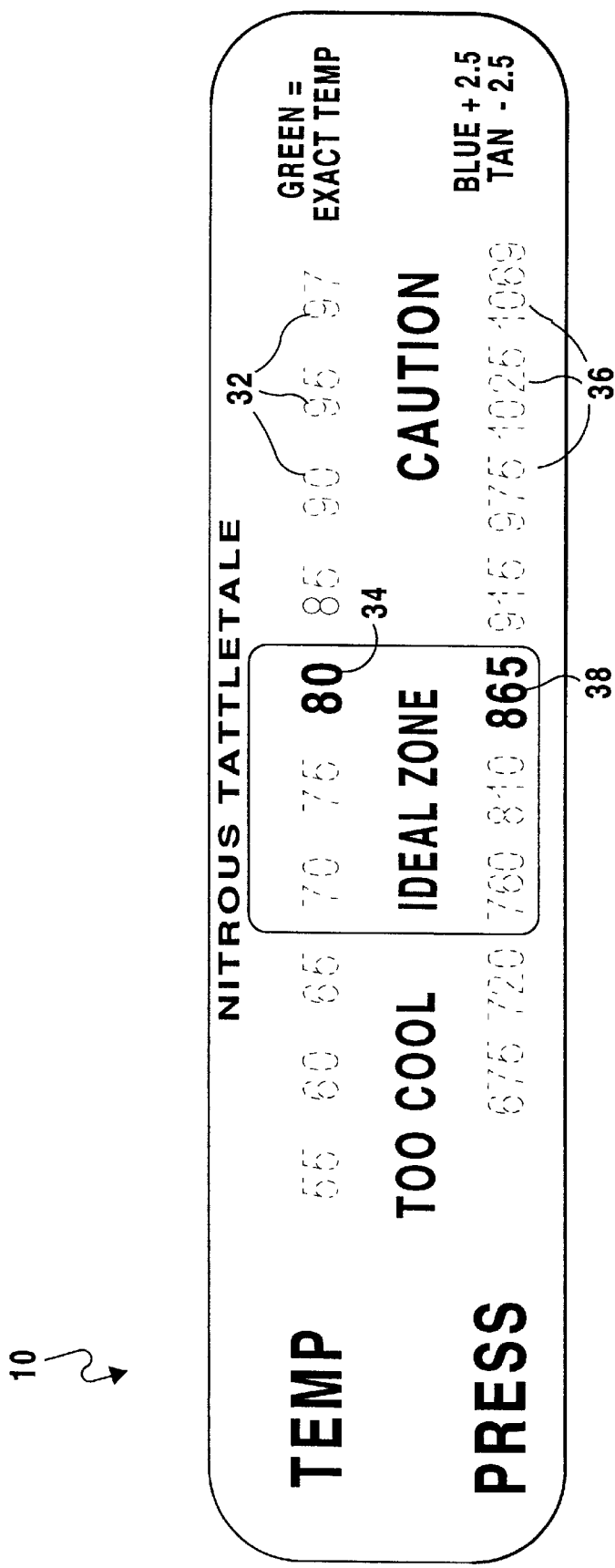
FIG. 3 is a view similar to FIG. 2 wherein the temperature and pressure display regions are illustrated by showing the displayed temperature and pressure readings in bold and the non-displayed regions in broken lines. In this figure, the displayed temperature is 80° F., within the ideal zone.
Figure 4:
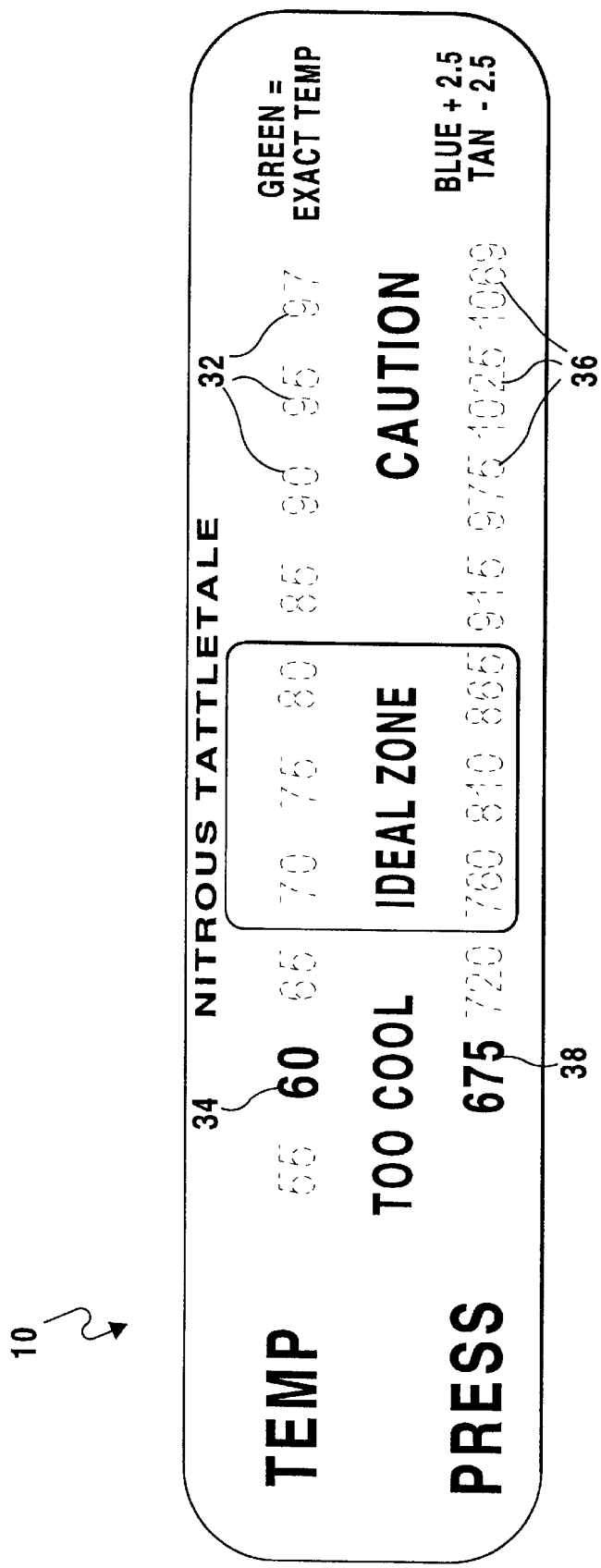
FIG. 4 is a view similar to FIG. 3 wherein the temperature and pressure display regions are illustrated by showing the displayed temperature and pressure readings in bold and the non-displayed regions in broken lines. In this figure, the displayed temperature is 60° F., cooler than is ideal.
Figure 5:
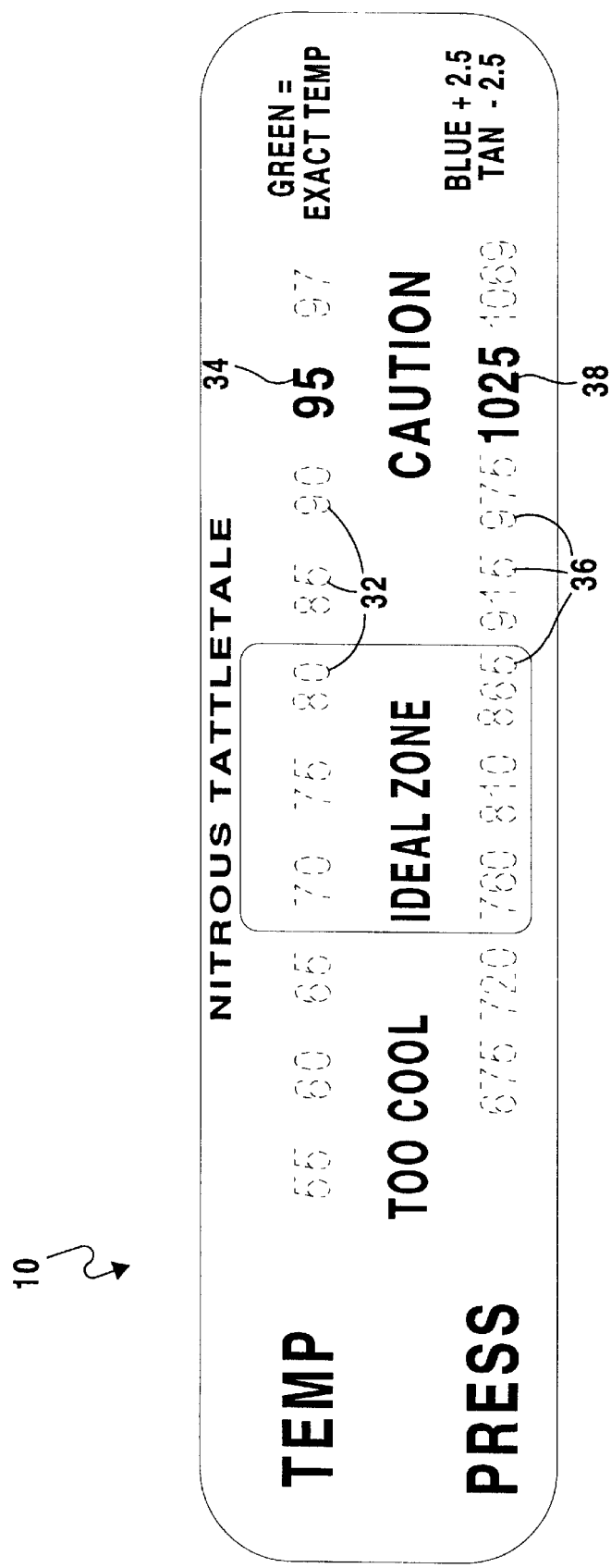
FIG. 5 is a view similar to FIG. 4 wherein the temperature and pressure display regions are illustrated by showing the displayed temperature and pressure readings in bold and the non-displayed regions in broken lines. In this figure, the displayed temperature is 95° F., warmer than is ideal.

The present invention, as illustrated in FIG. 2, is generally a substantially planar strip of material, for example, paper, plastic and the like, which can be affixed to the exterior surface of a container 8 of compressed liquefied gas. When affixed, the user can see the display side 12 of said strip, which contains a temperature display region 14 having a first set of numerals representing a range of temperature readings. A useful range would be from about 55° F. to about 97° F. The numbers are preferably arranged linearly, as is conventional.

The display side 12 of the strip also contains a pressure display region 16 having a second set of numerals representing a range of internal vapor pressure readings calculated to correspond to the numerals representing temperature readings. The value of the numerals will differ depending on the gas being monitored, but the values can be easily found in readily available technical references such as the CRC handbook. It is preferred in the present invention that the pressure numerals be arranged linearly and parallel to the temperature numerals, for ease of correlating the two.

Additionally, the display side 8 contains means for displaying the measured temperature and the calculated pressure numerals. The preferred means is a thermochromic material which changes color according to the temperature. These materials are well known in the art and include, for example, liquid crystals and leucodyes. For the present invention, the use of liquid crystals is preferred, as they are currently more sensitive to small temperature changes than leucodyes. Improvements in leucodye, and other technologies may shortly render them suitable for use in the present invention. The preferred liquid crystals are microencapsulated liquid crystals.

The liquid crystals are affixed to the display side in any pattern which would indicate the ambient temperature. For example, the liquid crystals could be affixed to the display side in the shapes of the numerals, with each numeral having a liquid crystal whose color change centers around that temperature. A preferred arrangement is for the letters and the background to the same color. At their thermochromic temperature, though, the liquid crystals will change color, thereby rendering the numeral visible. Another preferred arrangement is for the numerals all to be printed in readily visible ink on the display side, with the liquid crystals positioned adjacent to the numerals so that the numerals corresponding to the temperature and calculated internal vapor pressure are indicated.

The dual display temperature/pressure gauge of the present invention may also contain one or more informational regions on the display side of the strip, each of which will generally be printed conventionally.

These informational regions serve, for example, to identify the temperature 18 and pressure 20 display regions for the user. Other regions could act as general notifications that the temperature/pressure is too low 22, too high 24 or in the ideal zone 26. The ideal zone is generally from about 66 to about 84° F., more preferably from about 70 to about 80° F. Other informational regions might describe how to interpret the display region 28. For example, a commonly used liquid crystal has a color change range of about 5° F., changing first to tan, then to green, then to blue. If the color is green, the user is advised that that is the exact temperature. If the color is tan, the user is advised to subtract 2.5° F. to get the exact reading. If the color is blue, the user is advised to add 2.5° F. to get the exact reading. Due to the great flexibility in liquid crystal design, the characteristics of the present invention can be manipulated as is needed.

Other possible informational regions on the display side include, for example, identification of the gas being measured and an identification of manufacture (the source of the strip) 30.

In its preferred embodiment, the dual display temperature/pressure gauge of the present invention further includes an adhesive to attach the gauge to the container.

It will be understood that each of the elements described above, or two or more together, may also find a useful application in other types of applications differing from the type described above.

While the invention has been illustrated and described as embodied in a dual display temperature/pressure gauge for a container of compressed liquefied gas, it is not intended to be limited to the details shown, since it will be understood that various omissions, modifications, substitutions and changes in the forms and details of the formulation illustrated and in its operation can be made by those skilled in the art without departing in any way from the spirit and scope of the present invention.

Without further analysis, the foregoing will so fully reveal the gist of the present invention that others can, by applying current knowledge, readily adapt it for various applications without omitting features that, from the standpoint of prior art, fairly constitute essential characteristics of this invention.

What is claimed as new and desired to be protected by Letters Patent is set forth in the appended claims:

1. A dual display temperature/pressure gauge for a container of compressed liquefied gas comprising:
   a) a substantially planar strip of material;
   b) a display side of said strip which is visible when said strip is placed in contact with a container of compressed liquefied gas;
   c) a temperature display region on said display side of said strip, said temperature display region comprising a first set of numerals representing a range of temperature readings;
   d) a pressure display region on said display side of said strip, said pressure display region comprising a second set of numerals representing a range of internal vapor pressure readings calculated to correspond to said numerals representing temperature readings;
   e) means for displaying on said strip said first and second sets of numerals in a manner showing the relationship between pressure and temperature of the contents of said container and including means on said strip to identify a useful range of temperatures with related pressures; and
   f) said numerals having associated therewith thermochromic material to highlight ambient temperature thereby indicating the calculated internal vapor pressure of the contents of said container.

2. A dual display temperature/pressure gauge for a compressed liquefied gas as defined in claim 1, wherein said thermochromic material is a thermochromic liquid crystal material.

3. A dual display temperature/pressure gauge for a compressed liquefied gas as defined in claim 2, wherein said thermochromic liquid crystal material is a microencapsulated thermochromic liquid crystal material.

4. A dual display temperature/pressure gauge for a compressed liquefied gas as defined in claim 2, wherein said liquid crystal material is positioned adjacent to said first and second sets of numerals so that the numerals corresponding to the temperature and calculated internal vapor pressure are displayed.

5. A dual display temperature/pressure gauge for a compressed liquefied gas as defined in claim 4, wherein said first and second sets of numerals are arranged in a parallel, linear orientation, with each temperature numeral being adjacent to a corresponding calculated internal vapor pressure numeral.

6. A dual display temperature/pressure gauge for a compressed liquefied gas as defined in claim 1, wherein said first and second sets of numerals are arranged in a parallel, linear orientation, with each temperature numeral being adjacent to a corresponding calculated internal vapor pressure numeral.

7. A dual display temperature/pressure gauge for a compressed liquefied gas as defined in claim 1, wherein said internal vapor pressure numerals are calculated to correspond to the temperature numerals for the compressed liquefied gas nitrous oxide.

8. A dual display temperature/pressure gauge for a compressed liquefied gas as defined in claim 1, further comprising:
   a) a first informational region on said display side of said strip, said first informational region identifying said temperature display region; and
   b) a second informational region on said display side of said strip, said second informational region identifying said pressure display region.

9. A dual display temperature/pressure gauge for a compressed liquefied gas as defined in claim 8, further comprising:
   a) a third informational region on said display side of said strip, said third informational region identifying when the temperature is too low;
   b) a fourth informational region on said display side of said strip, said fourth informational region identifying when the temperature is too high; and
   c) a fifth informational region on said display side of said strip, said fifth informational region identifying when said temperature is in the ideal zone.

10. A dual display temperature/pressure gauge for a compressed liquefied gas as defined in claim 9, further comprising a sixth informational region on said display side of said strip, said sixth informational region describing how to interpret said temperature display region.

11. A dual display temperature/pressure gauge for a compressed liquefied gas as defined in claim 10, further comprising a seventh informational region on said display side of said strip, said seventh informational region identifying the gas being measured.

12. A dual display temperature/pressure gauge for a compressed liquefied gas as defined in claim 11, further comprising an adhesive to attach said gauge to the container of compressed liquefied gas.

13. A dual display temperature/pressure gauge for a compressed liquefied gas as defined in claim 12, wherein said strip is formed of paper.

14. A dual display temperature/pressure gauge for a compressed liquefied gas as defined in claim 12, wherein said strip is formed of plastic.

15. The method of displaying directly on the outside of a container of compressed liquefied gas when the internal vapor pressure of the container is too low or too high comprising the steps of:
   a) on a substantially planar strip of material displaying in a side by side relationship the temperature and calculated internal vapor pressure numerals of the contents of said container;
   b) including on said strip thermochromic material associated with numerals on said strip to highlight ambient temperature;
   c) identifying on said strip a useful range of temperatures with associated pressures; and
   d) mounting said planar strip on said container, thereby identifying on said planar strip both temperature and the calculated internal vapor pressure of the contents of said container and indicating when the internal vapor pressure of the container is too low or too high and also indicating the useful range of said temperatures for said container.

* * * * *